United States Patent
Nabeto

(10) Patent No.: US 12,169,960 B2
(45) Date of Patent: Dec. 17, 2024

(54) LEARNING DATA GENERATION DEVICE, LEARNING DEVICE, IDENTIFICATION DEVICE, GENERATION METHOD AND STORAGE MEDIUM

(71) Applicant: NEC Corporation, Tokyo (JP)

(72) Inventor: Yu Nabeto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 422 days.

(21) Appl. No.: 17/626,858

(22) PCT Filed: Jul. 29, 2019

(86) PCT No.: PCT/JP2019/029673
§ 371 (c)(1),
(2) Date: Jan. 13, 2022

(87) PCT Pub. No.: WO2021/019645
PCT Pub. Date: Feb. 4, 2021

(65) Prior Publication Data
US 2022/0262099 A1   Aug. 18, 2022

(51) Int. Cl.
*G06V 10/774* (2022.01)
*G06V 10/40* (2022.01)
(Continued)

(52) U.S. Cl.
CPC ............ *G06V 10/774* (2022.01); *G06V 10/40* (2022.01); *G06V 20/41* (2022.01); *G06V 20/48* (2022.01); *G10L 25/57* (2013.01)

(58) Field of Classification Search
CPC ...... G06V 10/774; G06V 10/40; G06V 20/41; G06V 20/48; G06V 10/82; G10L 25/57;
(Continued)

(56) References Cited

U.S. PATENT DOCUMENTS

2011/0258546 A1   10/2011   Hirakawa
2015/0318019 A1   11/2015   Singhal
(Continued)

FOREIGN PATENT DOCUMENTS

EP      3483741 A1 *  5/2019  ......... G06F 16/5838
JP      2005-167377 A   6/2005
(Continued)

OTHER PUBLICATIONS

JP Office Action for JP Application No. 2021-536487, mailed on Mar. 22, 2023 with English Translation.
(Continued)

*Primary Examiner* — Samir A Ahmed

(57) ABSTRACT

The verification unit 53A is configured to determine a matched section which is included in raw material data Dr and edited data De in common by performing verification of raw material feature quantity Fr that is feature quantity of the raw material data and editing feature quantity Fe that is feature quantity of the edited data De, the raw material data including at least one of video data or audio data. The labeling unit 54A is configured to generate, as label data DL corresponding to the raw material data Dr, information which defines the matched section as an important section and defines a section other than the matched section as a non-important section.

18 Claims, 12 Drawing Sheets

(51) Int. Cl.
*G06V 20/40* (2022.01)
*G10L 25/57* (2013.01)

(58) Field of Classification Search
CPC ...... G06N 3/084; G06N 20/10; G06N 3/0464; G06N 3/09; G11B 27/02; H04N 5/91
See application file for complete search history.

(56) References Cited

U.S. PATENT DOCUMENTS

| | | |
|---|---|---|
| 2018/0330183 A1 | 11/2018 | Tsunoda et al. |
| 2019/0147292 A1 | 5/2019 | Watanabe et al. |

FOREIGN PATENT DOCUMENTS

| | | | |
|---|---|---|---|
| JP | 2006-287319 A | | 10/2006 |
| JP | 2007-336106 A | | 12/2007 |
| JP | 2008-022103 A | | 1/2008 |
| JP | 2010-026981 A | | 2/2010 |
| JP | 2014-203133 A | | 10/2014 |
| JP | 2018-190332 A | | 11/2018 |
| JP | 2019020743 A | * | 2/2019 |
| JP | 2019-091138 A | | 6/2019 |
| WO | 2010/073695 A1 | | 7/2010 |

OTHER PUBLICATIONS

Japanese Office Action for JP Application No. 2021-536487 mailed on Sep. 20, 2022 with English Translation.
International Search Report for PCT Application No. PCT/JP2019/029673, mailed on Sep. 10, 2019.

* cited by examiner $$L1 + L3 + L5 + L7 > L2 + L4 + L6$$

$$L1a + L3a + L5a + L7a = L2 + L4 + L6$$

LEARNING DATA GENERATION DEVICE, LEARNING DEVICE, IDENTIFICATION DEVICE, GENERATION METHOD AND STORAGE MEDIUM

This application is a National Stage Entry of PCT/JP2019/029673 filed on Jul. 29, 2019, the contents of all of which are incorporated herein by reference, in their entirety.

TECHNICAL FIELD

The present invention relates to a technical field of a learning data generation device, a learning device, an identification device, a generation method, and a storage medium in machine learning.

BACKGROUND ART

A technique for generating a video digest from a moving image is disclosed in Patent Literature 1. Patent Literature 1 discloses a highlight extraction device that generates a learning data file based on training moving images prepared in advance and important scene moving images specified by a user, and detects an important scene from the target moving image based on the learning data file.

PRIOR ART DOCUMENTS

Patent Literature

Patent Literature 1: JP 2008-022103A

SUMMARY OF THE INVENTION

Problem to be Solved by the Invention

When the generation of the video digest is carried out through deep learning, a large amount of learning data (training data) is required. However, in order to generate learning data, an annotation work of correct answers that is manual labeling of important scenes is required. Thus, there is such an issue that a huge amount of labor is required.

In view of the above-described issue, it is therefore an example object of the present disclosure to provide a learning data generation device, a learning device, an identification device, a generation method, and a storage medium which are suitable for generating a digest.

Means for Solving the Problem

In one mode of the learning data generation device, there is provided a learning data generation device including: a verification unit configured to determine a matched section which is included in raw material data and edited data in common by performing verification of feature quantity of the raw material data and feature quantity of the edited data, the raw material data including at least one of video data or audio data; and a labeling unit configured to generate, as label data corresponding to the raw material data, information which defines the matched section as an important section and defines a section other than the matched section as a non-important section.

In one mode of the generation method, there is provided a generation method executed by a learning data generation device, the generation method including: determining a matched section which is included in raw material data and edited data in common by performing verification of feature quantity of the raw material data and feature quantity of the edited data, the raw material data including at least one of video data or audio data; and generating, as label data corresponding to the raw material data, information which defines the matched section as an important section and defines a section other than the matched section as a non-important section.

In one mode of the storage medium, there is provided a storage medium storing a program executed by a computer, the program causing the computer to function as: a verification unit configured to determine a matched section which is included in raw material data and edited data in common by performing verification of feature quantity of the raw material data and feature quantity of the edited data, the raw material data including at least one of video data or audio data; and a labeling unit configured to generate, as label data corresponding to the raw material data, information which defines the matched section as an important section and defines a section other than the matched section as a non-important section.

Effect of the Invention

An example advantage according to the present invention is to suitably generate and utilize the learning data necessary for generating the digest.

DESCRIPTION OF EXAMPLE EMBODIMENTS

Hereinafter, example embodiments of a learning data generation device, a learning device, an identification device, a generation method, and a storage medium will be described with reference to the drawings.

First Example Embodiment

[Overall Configuration]

Figure 1:
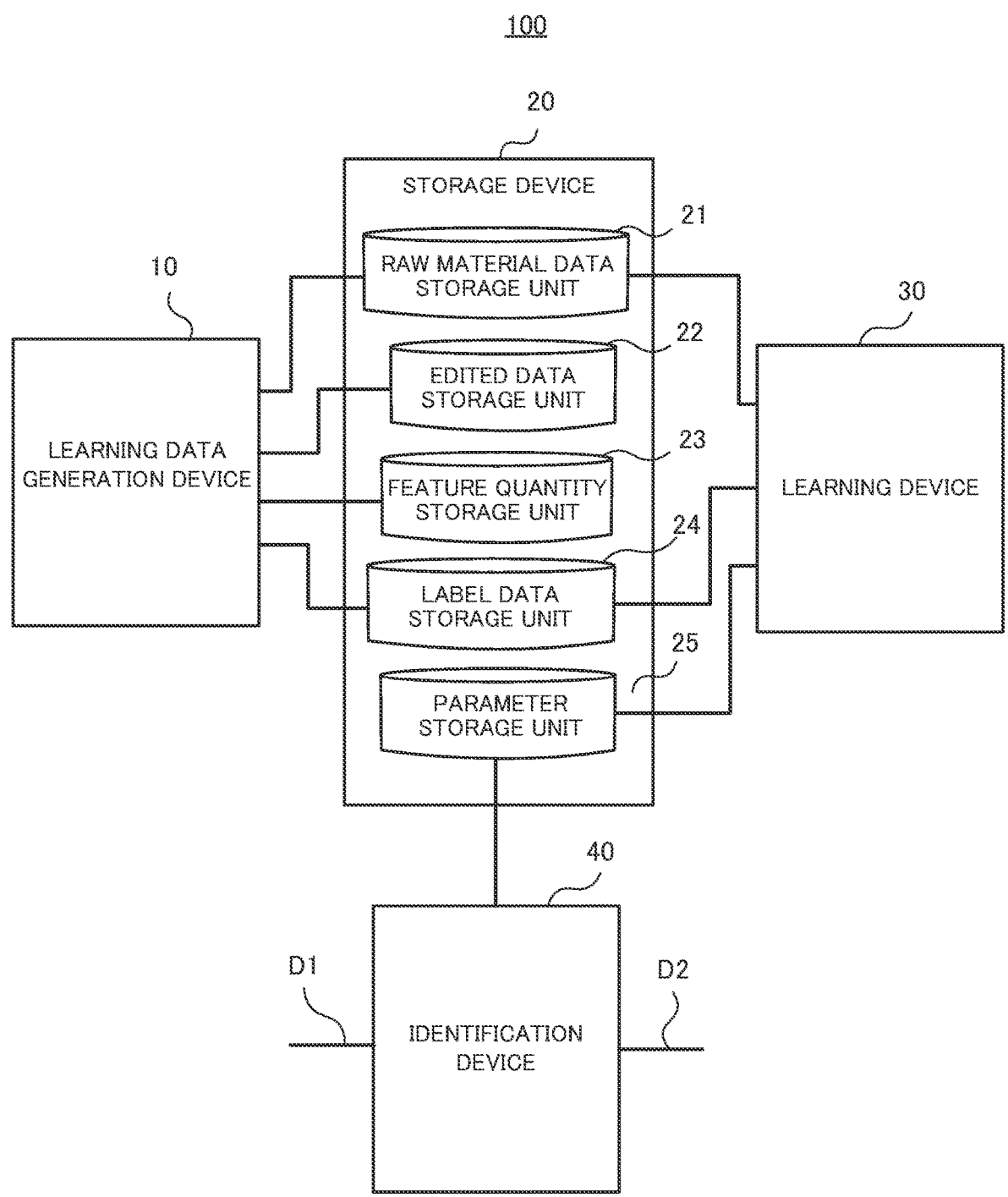
FIG. 1 illustrates a schematic configuration of a digest generation system according to a first example embodiment.

FIG. 1 is a schematic configuration of a digest generation system 100 in the example embodiment. The digest generation system 100 generates the learning data to be used for the learning of the model for generating the digest of the video data (which may include audio data, the same shall apply hereinafter), and performs the learning of the model, and generates the digest of the video data by use of the learned model. The digest generation system 100 includes a learning data generation device 10, a storage device 20, a learning device 30, and an identification device 40.

The learning data generation device 10 generates the learning data (i.e., training data) necessary for the learning of the model configured to generate the digest of the video data. Specifically, by matching edited video data (also referred to as "edited data De") that is the digest with video data (also referred to as "raw material data Dr") that was used to generate the edited data De, the learning data generation device 10 performs labeling on the raw material data Dr. Then, the learning data generation device 10 generates information (also referred to as "label data DL") indicating the result of the labeling on the target raw material data Dr as correct answer data. The label data DL is information that defines video sections in the raw material data Dr used for the edited data De as important sections (important scene) and video sections in the raw material data Dr not used for the edited data De as non-important sections (non-important scene). An important section corresponds to an important video section which was used for edited data De, and a non-important section corresponds to a video section which was not used for edited data De and has low importance.

The storage device 20 includes a raw material data storage unit 21, an edited data storage unit 22, a feature quantity storage unit 23, a label data storage unit 24, and a parameter storage unit 25. These storage units will be described later. The storage device 20 may be an external storage device such as a hard disk connected to or built in to the learning data generation device 10, the learning device 30, or the identification device 40, or may be a storage medium such as a flash memory, or may be a server device that performs data communication with the learning data generation device 10. Further, the storage device 20 may be configured by a plurality of storage devices and dispersedly hold the storage units described above.

The learning device 30 generates parameters of the identifier (discriminator) that performs identification regarding the important section and the non-important section in the inputted video data by using, as learning data, the raw material data Dr stored in the raw material data storage unit 21 and the label data DL stored in the label data storage unit 24. Then, the learning device 30 stores the generated parameters of the identifier in the parameter storage unit 25.

When the input data "D1" including the video data is inputted, the identification device 40 performs identification on the important section and the non-important section with respect to the input data D1, and outputs the output data "D2" based on the result of the identification. Here, the identification device 40 configures the identifier by referring to the parameters stored in the parameter storage unit 25, and inputs the input data D1 to the identifier thereby to generate the identification result relating to the important section and the non-important section. The identification device 40 may receive the input data D1 from any device that delivers video data through data communication or broadcasting, or may receive it from a motion picture camera or the like connected to the identification device 40. For example, the identification device 40 may provide predetermined display or/and sound output by providing output data D2 to a display device or/and a sound output device that connects to the identification device 40. In another example, the identification device 40 may transmit the output data D2 to another device that performs predetermined processing based on the output data D2.

Instead of the learning data generation device 10, the learning device 30, and the identification device 40 being configured as separate devices, at least two of the learning data generation device 10, the learning device 30, and the identification device 40 may be integrated as one device.

Next, the data stored in the storage device 20 will be described.

The raw material data storage unit 21 stores the raw material data Dr used for generating the edited data De. The raw material data Dr stored in the raw material data storage unit 21 is associated with the edited data De that was generated using the raw material data Dr. The edited data De is stored in the edited data storage unit 22. It is noted that the raw material data Dr and the edited data De may include not only video data that is image data (frame data) generated in time series but also audio data that is generated in the same time period as the video data.

Here, a description will be given of a specific example of a set of the raw material data Dr and the edited data De.

In the first example, the raw material data Dr is video data taken by one or a plurality of cameras at a photographing site, and the edited data De is video data for broadcasting generated by editing the raw material data Dr. In this case, the edited data De may be video data for sports relay such as baseball and soccer, or may be video data for relay other than sports such as broadcasts of parliamentary proceedings, or may be video data recorded in a studio or the like. In the second example, the raw material data Dr is video data used for broadcasting such as sports relays, and the edited data De is video data to be used in news programs dealing with the digest of broadcasts such as sports relays. It is noted that the raw material data Dr is not limited to the unedited video data outputted from the camera and it may be edited video data.

The raw material data Dr and edited data De are not limited to video data for broadcasting. For example, the raw material data Dr may be video data taken by a surveillance camera and the edited data De may be video data obtained by extracting important video sections such as a crime scene from the video data. Further, the raw material data Dr may be used for generating a plurality of edited data De. In this case, the raw material data Dr is stored in the raw material data storage unit 21 associated with the plurality of the edited data De.

The feature quantity storage unit 23 stores the feature quantity (also referred to as "raw material feature quantity Fr") of the raw material data Dr extracted by the learning data generation device 10. For example, the raw material feature quantity Fr is feature quantity in the time series of the raw material data Dr. For example, the raw material feature quantity Fr is generated for each video frame included in the raw material data Dr. The raw material feature quantity Fr may include feature quantity extracted from the audio data.

The label data storage unit 24 stores the label data DL generated by the learning data generation device 10. The label data DL stored in the label data storage unit 24, respectively, is associated with any of the raw material data Dr stored in the raw material data storage unit 21.

The parameter storage unit 25 stores the parameters of the identifier learned by the learning device 30. The above-described identifier is, for example, a learning model that is learned to output an identification result regarding important sections and non-important sections in the inputted video data when video data captured by a camera is inputted. The learning model may be a learning model based on a neural network, or may be another type of learning model such as a support vector machine, or may be a learning model that is a combination thereof. For example, when the above-described identifier has a neural network-based configuration, the parameter storage unit 25 stores information on various parameters regarding the layer structure of the identifier, the neuron structure of each layer, the number of filters and the filter size in each layer, and the weight of each element of each filter.

[Hardware Configuration]

Next, each hardware configuration of the learning data generation device 10, the learning device 30, and the identification device 40 will be described.

Figure 2A:
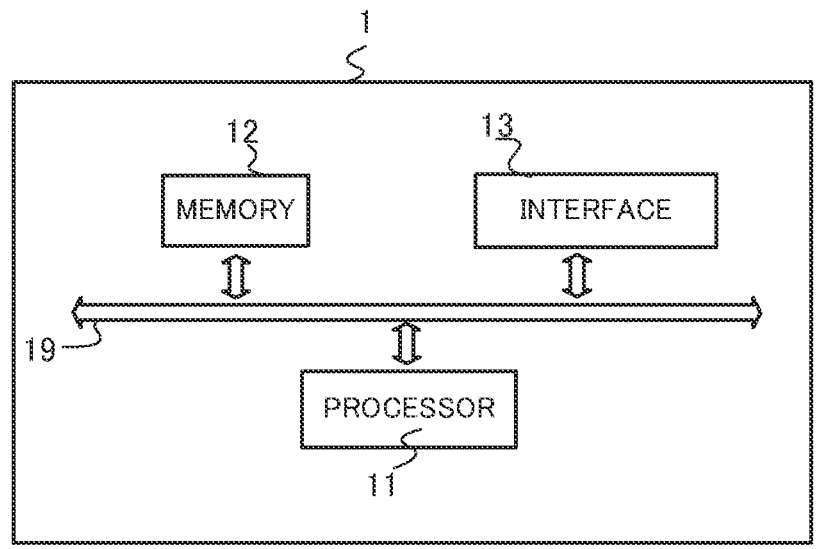
FIG. 2A illustrates an example of the hardware configuration of a learning data generation device.

FIG. 2A shows an example of a hardware configuration of the learning data generation device 10. The learning data generation device 10 includes, as hardware, a processor 11, a memory 12, and an interface 13. The processor 11, the memory 12, and the interface 13 are connected to one another via a data bus 19.

The processor 11 executes a predetermined process by executing a program stored in the memory 12. The processor 11 is a processor such as a CPU (Central Processing Unit) and a GPU (Graphics Processing Unit).

The memory 12 is configured by various memories such as a RAM (Random Access Memory), a ROM (Read Only Memory), and a flash memory. The memory 12 stores a program for executing a process related to the generation of the learning data executed by the learning data generation device 10. The memory 12 is used as a work memory and temporarily stores information acquired from the storage device 20. The memory 12 may function as the storage device 20 or a part of the storage device 20. In this case, the memory 12 may include at least one of the raw material data storage unit 21, the edited data storage unit 22, the feature quantity storage unit 23, and the label data storage unit 24 instead of the storage device 20 including all of them. Similarly, the storage device 20 may function as the memory 12 of the learning data generation device 10.

The interface 13 is a communication interface for wired or wireless transmission and reception of data to and from the storage device 20 under the control of the processor 11. Examples of the interface 13 include a network adapter. The learning data generation device 10 and the storage device 20 may be connected by a cable or the like. In this case, the interface 13 may be an interface that conforms to a USB or a SATA (Serial AT Attachment) for performing data communication with the storage device 20 instead of a communication interface for exchanging data with the storage device 20.

The hardware configuration of the learning data generation device 10 is not limited to the configuration shown in FIG. 2A. For example, the learning data generation device 10 may further include a display unit such as a display, an input unit such as a keyboard and a mouse, a sound output unit such as a speaker, and the like. Further, the learning data generation device 10 may be configured by a plurality of devices. In this case, each of these devices transmits and receives information necessary for each of the devices to perform processing allocated to each of the devices in advance.

Figure 2B:
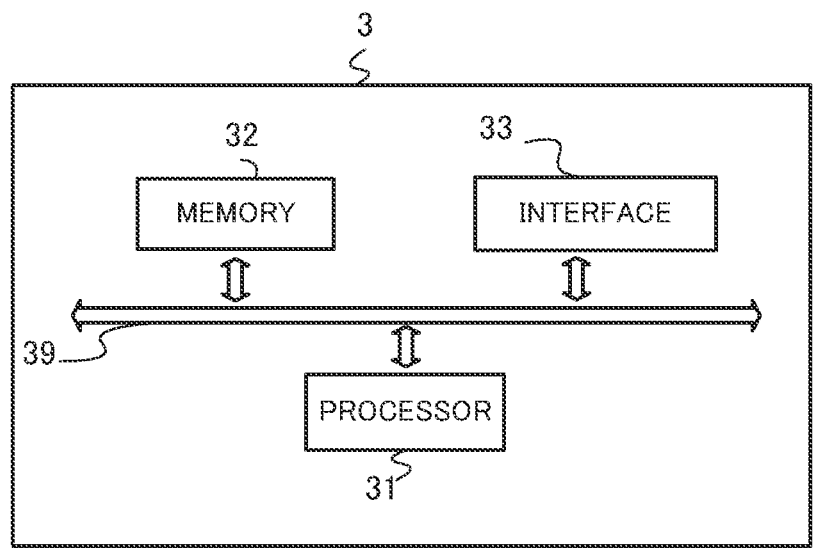
FIG. 2B illustrates an example of the hardware configuration of a learning device.

FIG. 2B illustrates an example of a hardware configuration of the learning device 30. The learning device 30 includes, as hardware, a processor 31, a memory 32, and an interface 33. The processor 31, memory 32, and interface 33 are connected to one another via a data bus 39.

The processor 31 executes a predetermined process by executing a program stored in the memory 32. The processor 31 is a processor such as a CPU and GPU. The interface 33 is a communication interface for wirelessly or wirelessly transmitting and receiving data to and from the storage device 20 under the control of the processor 31.

The memory 32 is configured by various memories such as a RAM, a ROM, and a flash memory. The memory 32 stores a program for executing a process related to the learning (training) process executed by the learning device 30. The memory 32 is used as a work memory and temporarily stores information acquired from the storage device 20. The memory 32 may function as the storage device 20 or a part of the storage device 20. In this case, the memory 32 may include at least one of the raw material data storage unit 21, the label data storage unit 24, and the parameter storage unit 25 instead of the storage device 20 including all of them. Similarly, the storage device 20 may function as the memory 32 of the learning device 30.

The hardware configuration of the learning device 30 is not limited to the configuration shown in FIG. 2B. For example, the learning device 30 may further include a display unit such as a display, an input unit such as a keyboard and a mouse, a sound output unit such as a speaker, and the like. Further, the learning device 30 may be configured by a plurality of devices. In this case, each of these devices transmits and receives information necessary for each of the devices to perform processing allocated to each of the devices.

Figure 2C:
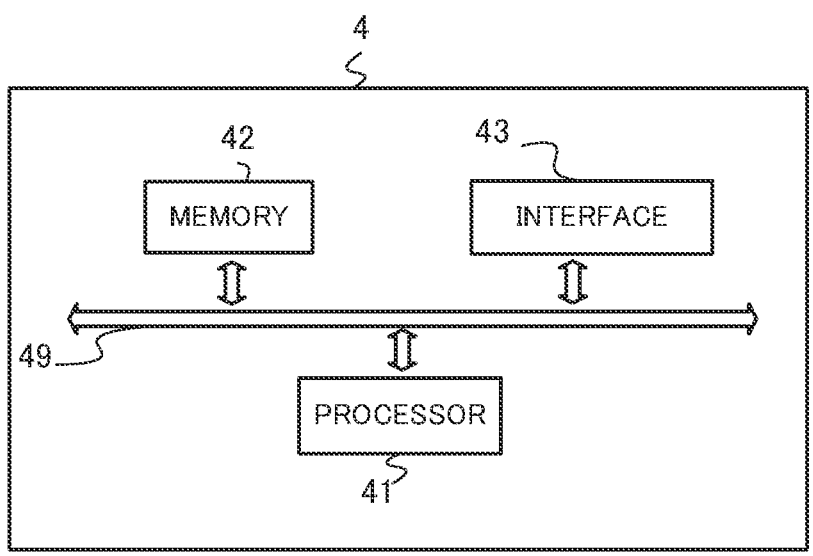
FIG. 2C illustrates an example of the hardware configuration of an identification device.

FIG. 2C shows an example of a hardware configuration of the identification device 40. The identification device 40 includes, as hardware, a processor 41, a memory 42, and an interface 43. The processor 41, memory 42, and interface 43 are connected to one another via a data bus 49.

The processor 41 executes a predetermined process by executing a program stored in the memory 42. The processor 41 is a processor such as a CPU and GPU. The interface 43 is an interface for wired or wireless transmission and reception of data to and from the storage device 20, the device which supplies the input data D1, and the device to which the output data D2 is supplied, under the control of the processor 41.

The memory 42 is configured by various memories such as RAM, ROM, and flash memory. The memory 42 stores a program for executing a process related to learning executed by the identification device 40. Further, the memory 42 is used as a work memory, and temporarily stores information acquired from the storage device 20. The memory 42 may function as the storage device 20 or a part of the storage device 20. In this case, the memory 42 may include the parameter storage unit 25 instead of the storage device 20 including the parameter storage unit 25. Similarly, the storage device 20 may function as the memory 42 of the identification device 40.

The hardware configuration of the identification device 40 is not limited to the configuration shown in FIG. 2C. For example, the identification device 40 may further include a display unit such as a display, an input unit such as a keyboard or a mouse, a sound output unit such as a speaker, and the like. Further, the identification device 40 may be configured by a plurality of devices. In this case, each of these devices transmits and receives information necessary for each device to perform processing allocated to each of the devices.

[Functional Block]

Next, a functional configuration of the digest generation system 100 will be described.

Figure 3:
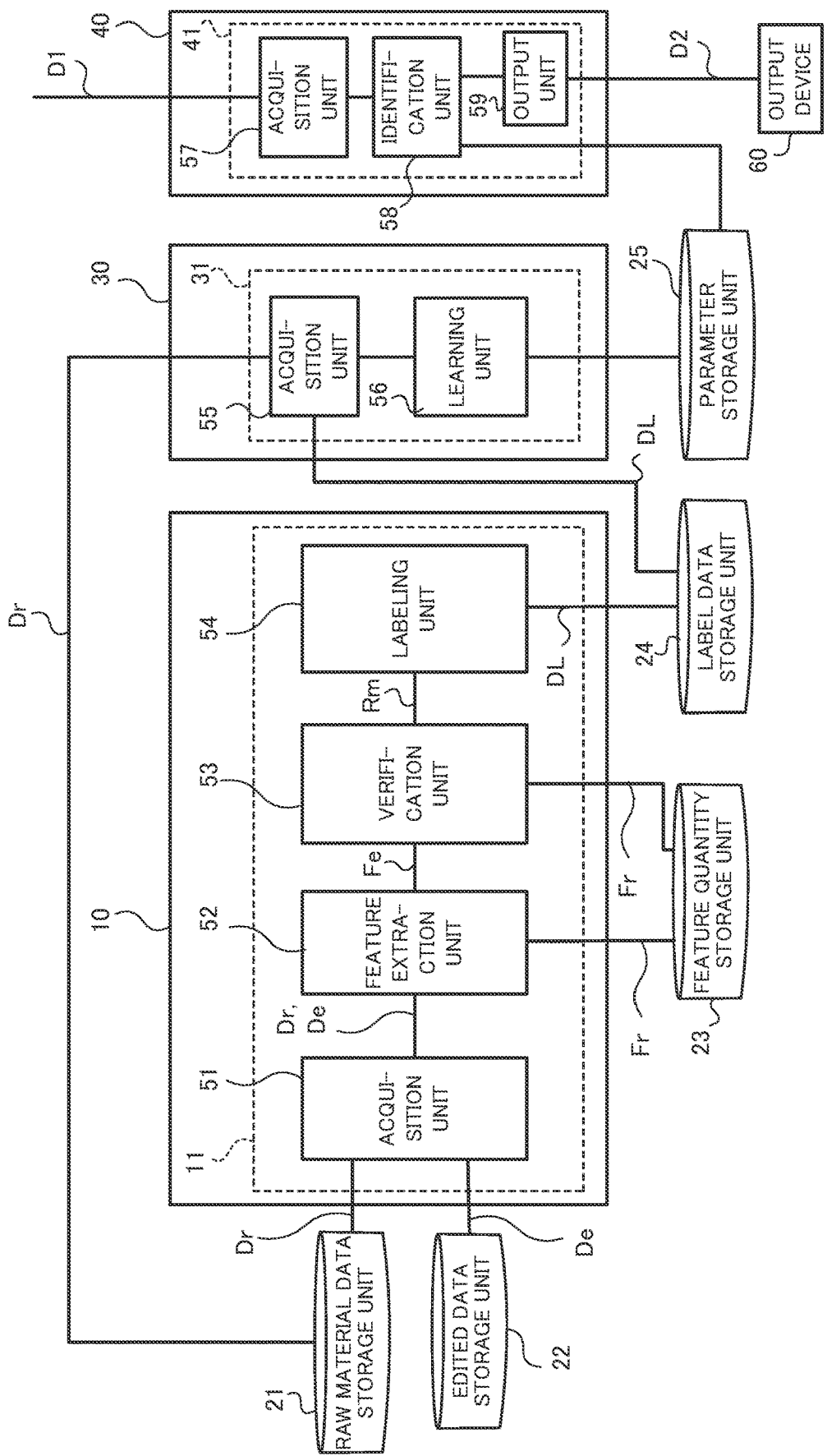
FIG. 3 illustrates an example of a functional block of a digest generation system.

FIG. 3 is an example of a functional block of the digest generation system 100. As shown in FIG. 3, the processor 11 of the learning data generation device 10 includes an acquisition unit 51, a feature extraction unit 52, a verification unit 53, and a labeling unit 54. The processor 31 of the learning device 30 includes an acquisition unit 55 and a learning unit 56. Further, the processor 41 of the identification device 40 includes an acquisition unit 57, an identification unit 58, and an output unit 59.

The acquisition unit 51 acquires the raw material data Dr from the raw material data storage unit 21 through the interface 13. The acquisition unit 51 acquires the edited data De from the edited data storage unit 22 through the interface 13.

The feature extraction unit 52 performs feature quantity extraction on the raw material data Dr acquired by the acquisition unit 51, and stores the extracted raw material feature quantity Fr in the feature quantity storage unit 23. The raw material feature quantity Fr may be a set of feature quantity for each video frame of the raw material data Dr, or may be a set of feature quantity per a predetermined number of video frames. Although various approaches exist for the extraction technique of such feature quantity, it is not limited to a specific technique, and any technique may be used in this example embodiment.

Further, the feature extraction unit 52 performs feature quantity extraction on the edit data De acquired by the acquisition unit 51 based on the same algorithm as the feature quantity extraction performed for the raw material data Dr. Then, the feature extraction unit 52 supplies the extracted feature quantity (also referred to as "editing feature quantity Fe") of the edited data De to the verification unit 53.

When receiving the editing feature quantity Fe for the edited data De from the feature extraction unit 52, the verification unit 53 extracts the raw material feature quantity Fr of the raw material data Dr associated with the edited data De from the feature quantity storage unit 23. Then, by performing the verification of the editing feature quantity Fe and the raw material feature quantity Fr, the verification unit 53 determines a video section (also referred to as "matched section") which coincides between the target edited data De and the raw material data Dr. Although various approaches exist for the matching (verification) process in the images, it is not limited to a specific method and any method may be used in the present example embodiment. Then, the verification unit 53 supplies the verification result "Rm" indicating the matched sections (coincidence sections) based on the verification between the editing feature quantity Fe and the raw material feature quantity Fr to the labeling unit 54.

On the basis of the verification result Rm supplied from the verification unit 53, the labeling unit 54 generates label data DL to be added to the raw material data Dr for which the verification based on the feature quantity has been performed by the verification unit 53. Specifically, on the basis of the verification result Rm, the labeling unit 54 generates the label data DL which defines matched sections in the raw material data Dr, which coincide between the raw material data Dr and the edited data De, as important sections and which defines non-matched sections other than the matched sections as non-important sections. The labeling unit 54 stores the generated label data DL in the label data storage unit 24.

Here, a specific example of the processing executed by the verification unit 53 and the labeling unit 54.

Figure 4:
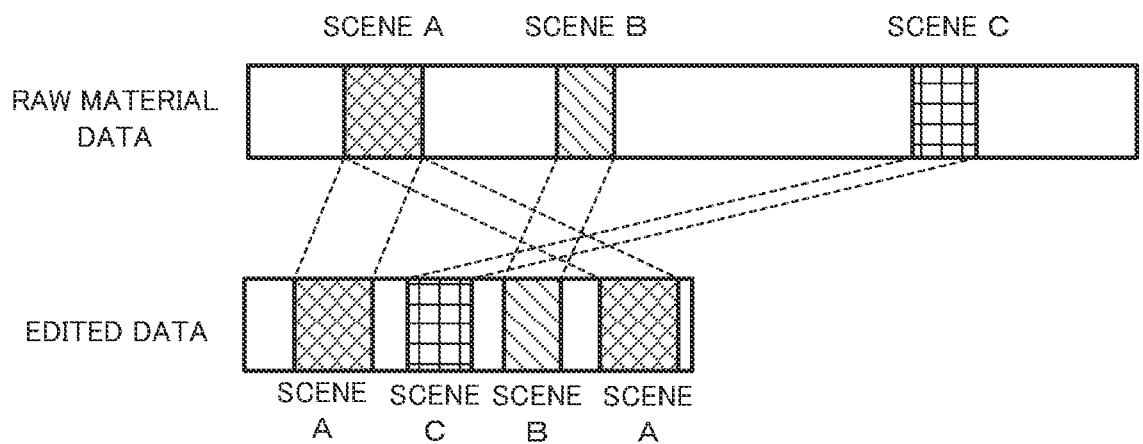
FIG. 4A illustrates an example of a verification result between raw material data and edited data.
FIG. 4B illustrates an example of a verification result between N raw material data and the edited data.
Figure 4:
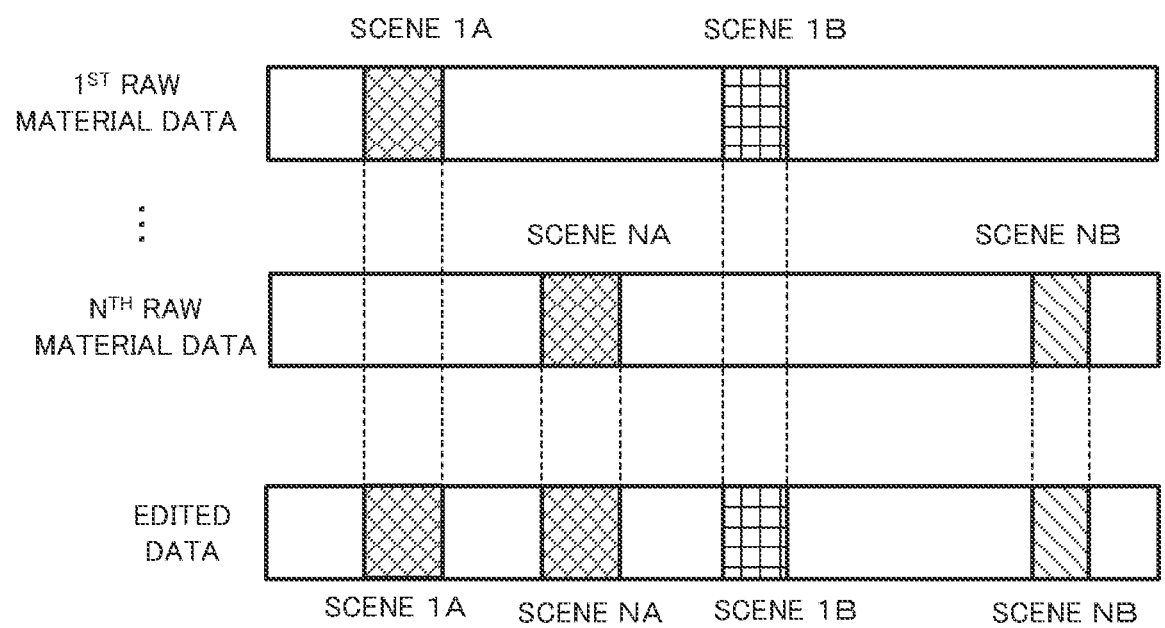

FIG. 4A illustrates an example of the verification result between the raw material data Dr and the edited data De. FIG. 4A shows the raw material data Dr and edited data De in the form of a band graph corresponding to the time length (i.e., the number of frames) of each content. The raw material data Dr shown in FIG. 4A includes a scene A and a scene B and a scene C used in the edited data De. The edit data De includes partial data of the raw material data Dr in the order of the scene A, the scene C, the scene B, and the scene A.

In this case, through the verification (i.e., cross-check or collation) between the raw material feature quantity Fr and editing feature quantity Fe, the verification unit 53 determines that each video section of the scene A, the scene B, and the scene C in the raw material data Dr and edited data De is a matched section. Then, the labeling unit 54 generates the label data DL which indicates that the video sections corresponding to the scene A, the scene B, and the scene C are important sections and that the other video sections are non-important sections.

FIG. 4B illustrates an example of a verification result between N pieces of the raw material data Dr (first raw material data Dr to Nth raw material data Dr) and the edited data De. Here, the raw material data Dr is video data captured respectively from the N cameras and the edited data De is video data generated by editing N pieces of the raw material data Dr.

In this case, the verification unit 53 determines the matched section between each of the N pieces of the raw material data Dr and the edited data De. In the example of FIG. 4B, through the verification between the raw material feature quantity Fr of the first raw material data Dr and the editing feature quantity Fe, the verification unit 53 determines that each video section corresponding to the scene 1A and the scene 1B in the first raw material data Dr is a matched section with the edited data De. In this case, the labeling unit 54 generates the label data DL, which corresponds to the first raw material data Dr, indicating that each video section corresponding to the scene 1A and the scene 1B is an important section and the other sections are non-important sections. In the same way, through the collation between the raw material feature quantity Fr of the N-th raw material data Dr and the editing feature quantity Fe, the verification unit 53 determines that each video section corresponding to the scene NA and the scene NB in the N-th raw material data Dr is a matched section with the edited data De. In this case, the labeling unit 54 generates the label data DL, which corresponds to the Nth raw material data Dr, indicating that each video section corresponding to the scene NA and the scene NB is an important section and the other video sections are non-important sections.

In this way, in such case where N pieces of raw material data Dr are associated with one piece of the edited data De, the learning data generation device 10 performs the verification between the raw material feature quantity Fr corresponding to each of the N pieces of the raw material data Dr and the editing feature quantity Fe thereby to generate the label data DL corresponding to each of the N pieces of the raw material data Dr.

Referring again to FIG. 3, a functional configuration of the learning device 30 and the identification device 40 will be described.

The acquisition unit 55 of the learning device 30 acquires the raw material data Dr from the raw material data storage unit 21 via the interface 33, and acquires the label data DL corresponding to the raw material data Dr from the label data storage unit 24. The acquisition unit 55 supplies the learning unit 56 with the set of the raw material data Dr and label data DL as learning data.

The learning unit 56 uses the set of the raw material data Dr and the label data DL received from the acquisition unit 55 as learning data thereby to perform the learning of the identifier for identifying important sections and non-important sections in the inputted video data. The learning unit 56 may apply a learning model based on a neural network such as a convolutional neural network to the identifier or may apply any other type of the learning model such as a support vector machine. In this case, for example, the learning unit 56 calculates a loss for identification based on the current parameters (including the initial value), and updates the parameters of the learning model so that the loss decreases. The algorithm for determining the parameters in this case may be any algorithm used in machine learning, such as the gradient descent method and the error back propagation method. Then, the learning unit 56 updates the parameters of the learning model for each of plural sets of the learning data, and stores in the parameter storage unit 25 the latest parameters of the learning model at the time when the training using all the learning data is completed.

The acquisition unit 57 of the identification device 40 acquires the input data D1 via the interface 43 from an external device. Then, the acquisition unit 57 supplies the acquired input data D1 to the identification unit 58. When the input data D1 is supplied from the acquisition unit 57, the identification unit 58 inputs the input data D1 to the identifier configured based on the parameters stored in the parameter storage unit 25. Then, the identification unit 58 supplies the identification result outputted by the above-described identifier to the output unit 59. The output unit 59 generates the output data D2 based on the identification result supplied from the identification unit 58, and outputs the output data D2 to another device via the interface 43. In the example of FIG. 3, the output unit 59 provides the output data D2 to the output device 60 such as a display and a sound output device. In this case, the output unit 59 generates the output data D2 including at least one of the display data or audio data for performing a predetermined notification based on the identification result supplied from the identification unit 58.

It is noted that the input data D1 may be video data in file units or may be streaming data (including broadcast data) to be acquired in real time from a camera or the like. In the former case, the identification unit 58 inputs the video data in file units acquired as the input data D1 to the identifier, and supplies the identification result regarding the important sections and the non-important sections extracted from the whole video section in the video data to the output unit 59. In the latter case, the identification unit 58 identifies whether the data in frame units or in predetermined time units acquired by the acquisition unit 57 belongs to an important section or a non-important section, and supplies the identification result to the output unit 59. In this case, for example, while outputting the video data acquired in real time by the acquisition unit 57 as the input data D1 to the identification device 40, the output unit 59 outputs to the output device 60 a notification (warning) indicating that the target video data of output belongs to an important section to the output device 60 when it is determined that the target video data of output belongs to an important section.

[Processing Flow]

Next, a processing flow performed by the learning data generation device 10, the learning device 30, and the identification device 40 will be described.

(1) Material Feature Generation Process

Figure 5:
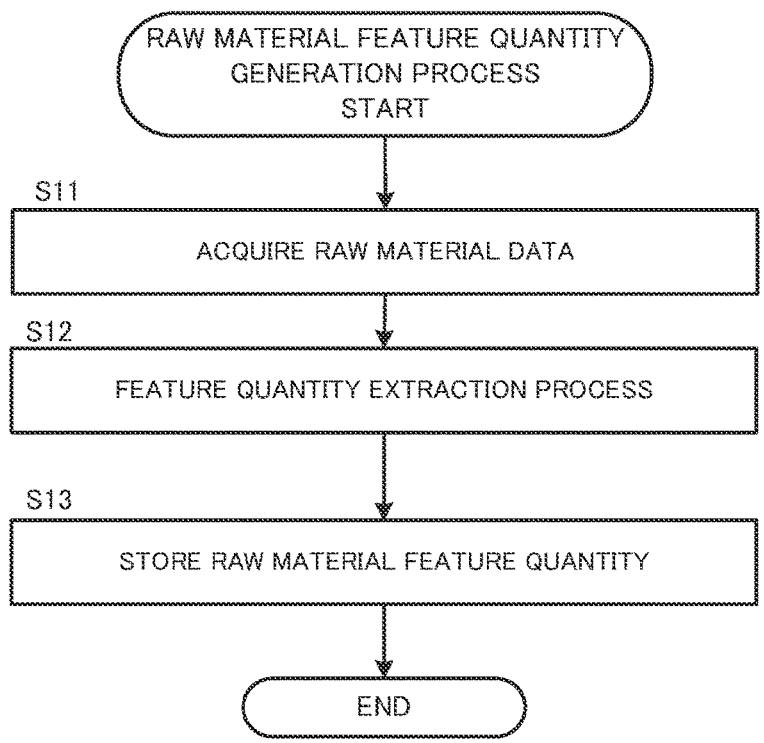
FIG. 5 illustrates an example of a flowchart showing a processing procedure of raw material feature quantity generation process.

FIG. 5 is an example of a flowchart illustrating a processing procedure executed by the learning data generation device 10 regarding the process (also referred to as "raw material feature quantity generation process") of generating the raw material feature quantity Fr to be executed prior to the process (also referred to as "label data generation process") of generating the label data DL. The learning data generation device 10 executes the processing of the flowchart shown in FIG. 5 for each piece of the raw material data Dr to be used for learning.

First, the acquisition unit 51 of the learning data generation device 10 acquires, from the raw material data storage unit 21, such raw material data Dr that the corresponding label data DL is not generated yet (Step S11). Then, the feature extraction unit 52 executes the feature quantity extraction process for the raw material data Dr obtained at Step S11 by the acquisition unit 51 (Step S12). Then, the feature extraction unit 52 stores the raw material feature quantity Fr obtained by the feature quantity extraction process at Step S12 in the feature quantity storage unit 23 in association with the raw material data Dr acquired at Step S11 by the acquisition unit 51 (Step S13). Then, the learning data generation device 10 repeatedly executes the process at Step S11 to S13 for other raw material data Dr to be used for learning and with no corresponding label data DL.

(2) Label Data Generation Process

Figure 6:
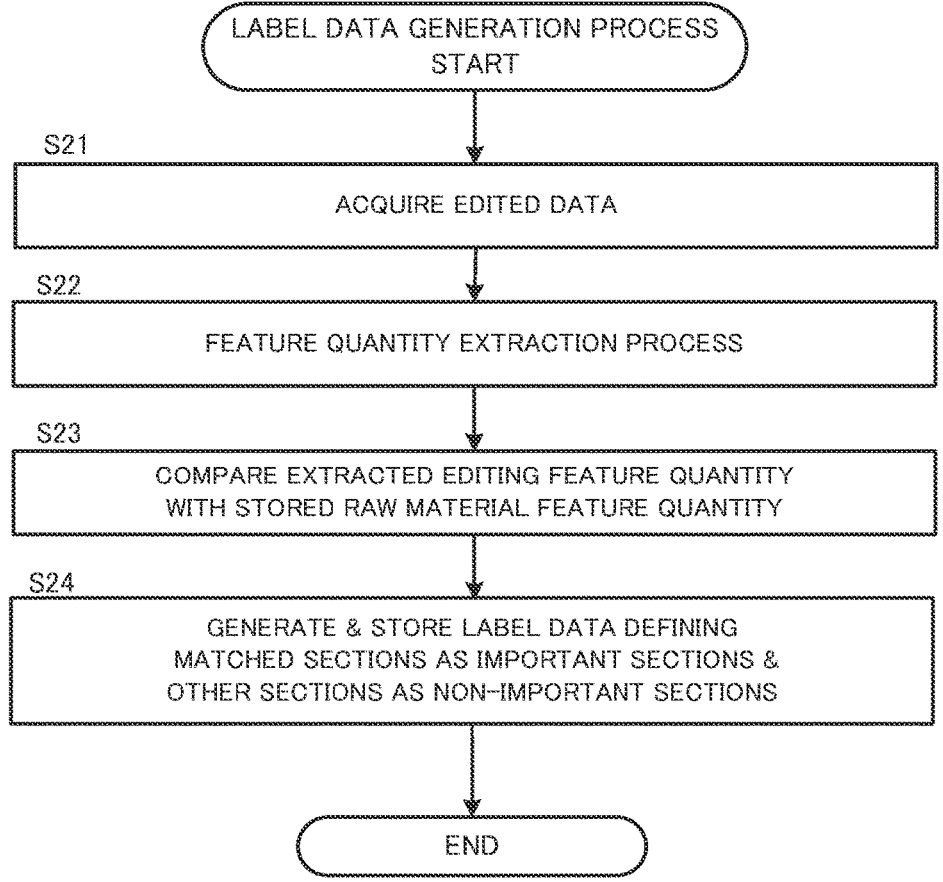
FIG. 6 illustrates an example of a flowchart showing a processing procedure of the label data generation process.

FIG. 6 is an example of a flowchart illustrating a processing procedure of the label data generation processing performed by the learning data generation device 10 after the execution of the raw material feature quantity generation processing. The learning data generation device 10 executes processing of the flowchart shown in FIG. 6 for each piece of the edited data De to be used for training.

First, the acquisition unit 51 of the learning data generation device 10 acquires, from the edited data storage unit 22, the edited data De to be used for learning and not yet acquired by the acquisition unit 51 (Step S21). Then, the feature extraction unit 52 executes the feature quantity extraction process for the edited data De that the acquisition unit 51 acquires at Step S21 (Step S22). Then, the verification unit 53 acquires the raw material feature quantity Fr of the raw material data Dr related to the target edited data De from the feature quantity storage unit 23, and compares the editing feature quantity Fe extracted by the feature extraction unit 52 at Step S22 with the raw material feature quantity Fr acquired from the feature quantity storage unit 23 (Step S23). Then, on the basis of the verification result Rm which the verification unit 53 outputs, the labeling unit 54 generates the label data DL which indicates that sections in the raw material data Dr where the two feature quantities described above match are important sections and sections in the raw material data Dr where the two feature quantities does not match are non-important sections. The labeling unit 54 stores the generated label data DL in the label data storage unit 24 in association with the corresponding raw material data Dr (step S24). In such a case that there are plural pieces of raw material data Dr corresponding to the edit data De acquired at Step S21, the labeling unit 54 generates the label data DL corresponding to each piece of the raw material data Dr. The labeling unit 54 stores the label data DL in the label data storage unit 24 in association with the corresponding raw material data Dr.

(3) Learning Processing

Figure 7:
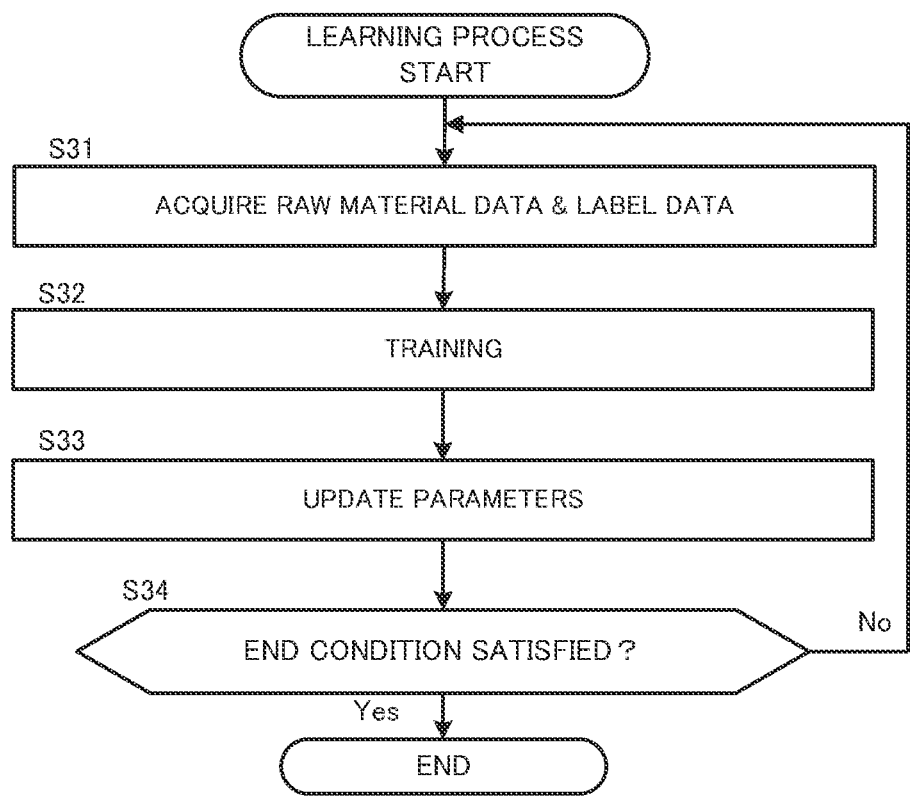
FIG. 7 illustrates an example of a flowchart showing the processing procedure of learning process.

FIG. 7 is an example of a flowchart illustrating a processing procedure of a learning process executed by the learning device 30.

First, the acquisition unit 55 of the learning device 30 acquires the raw material data Dr that has not yet been acquired by the acquisition unit 55 from the raw material data storage unit 21 and acquires the label data DL corresponding to the raw material data Dr from the label data storage unit 24 (Step S31).

Then, the learning unit 56 performs training by using the set of the raw material data Dr and the label data DL acquired at Step S31 as the learning data (Step S32). In this case, for example, the learning unit 56 performs identification by inputting the target raw material data Dr to the identification using the current parameters, and calculates a loss for the identification using the label data DL, and determines the parameters of the identifier so that the loss is reduced. Then, the learning unit 56 updates the parameters to be stored in the parameter storage unit 25 by the parameters obtained through the training (Step S33).

Then, the learning device 30 determines whether or not the end condition of the learning is satisfied (Step S34). For example, when the learning device 30 detects a user input or the like indicating that the learning should be terminated, or when the processing at Step S31 to S33 is executed for the all sets of the raw material data Dr and the label data DL stored in the raw material data storage unit 21 and the label data storage unit 24, the learning device 30 determines that the end condition is satisfied. Then, when the learning device 30 determines that the end condition of the learning is satisfied (Step S34; Yes), the processing of the flowchart ends. On the other hand, when the learning device 30 determines that the end condition of the learning is not satisfied (Step S34; No), the processing returns to Step S31.

(4) Identification Processing

Figure 8:
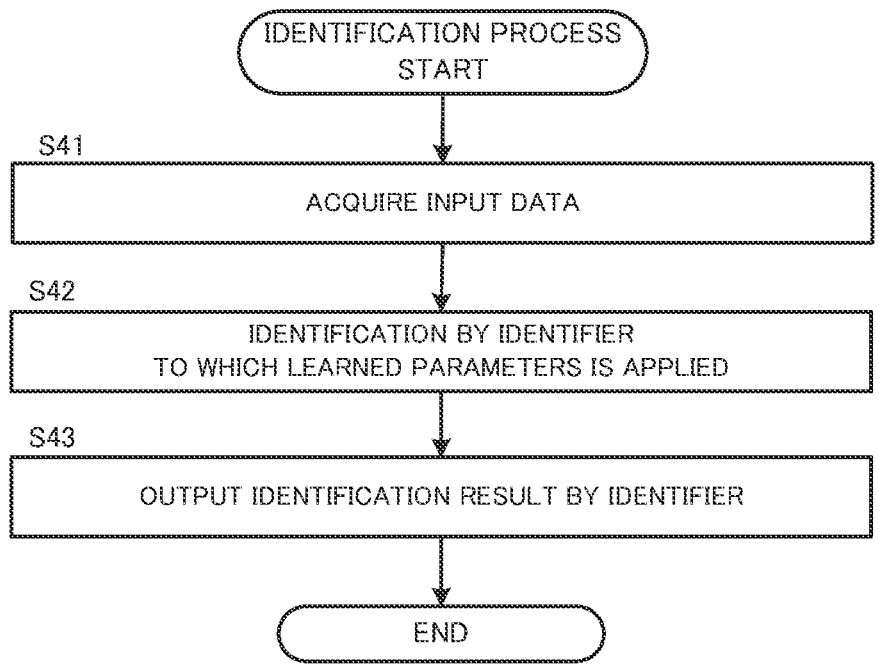
FIG. 8 illustrates an example of a flowchart showing a processing procedure of identification process.

FIG. 8 is an example of a flowchart showing the processing procedure of the identification process performed by the identification device 40. The identification device 40 repeatedly executes the processing of the flowchart in FIG. 8.

The acquisition unit 57 of the identification device 40 acquires the input data D1 inputted from an external device (Step S41). Then, the identification unit 58 inputs the input data D1 to the identifier to which the learned parameters stored in the parameter storage unit 25 is applied, and performs identification relating to the important section and the non-important section (Step S42). Then, the output unit 59 outputs the output data D2 based on the identification result by the identification unit 58 (step S43). In the first example, when receiving the input data D1 including the video data in file units at step S41, the identification device 40 executes the processing at Step S42 and Step S43 on the video data in file units. In the second example, the identification device 40 acquires the input data D1 including streaming data such as broadcast data, and repeatedly executes the processing at Step S42 and Step S43 on the input data D1 in real time. In this case, when determining that the input data D1 under processing belongs to the important section, the identification device 40 may output to the output device 60 a notification (warning) indicating that an important section is being outputted.

[Modification]

Next, a description will be given of preferred modifications to the first example embodiment. The following modifications may be applied to the first example embodiment described above in arbitrary combination.

(First Modification)

Figure 9A:
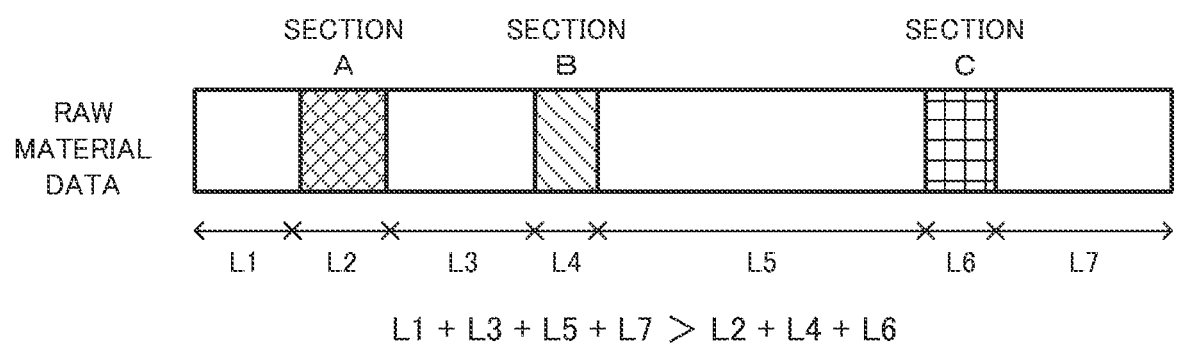
FIG. 9A illustrates the length of the important section and the length of the non-important section in the raw material data.

At Step S32 in FIG. 7, the learning unit 56 may normalize the raw material data Dr and the label data DL so that the total length of the important sections in the raw material data Dr used for learning is equal to the total length of the non-important sections and perform training based on the normalized raw material data Dr and the label data DL FIG. 9A illustrates the length of each important section and each non-important section in the raw material data Dr when using the raw material data Dr shown in FIG. 4A as learning data. In this case, the term "length" shall represent the time length or the number of frames.

As shown in FIG. 9A, the total length (L2+L4+L6) of the important sections in the raw material data Dr acquired as the learning data is shorter than the total length (L1+L3+L5+L7) of the non-important sections. When the learning of the identifier is carried out based on this raw material data Dr, the amount of the training for the non-important sections becomes larger than the amount of the training for the important sections, and there is a possibility that the bias arises in the learning of the identifier.

Figure 9B:
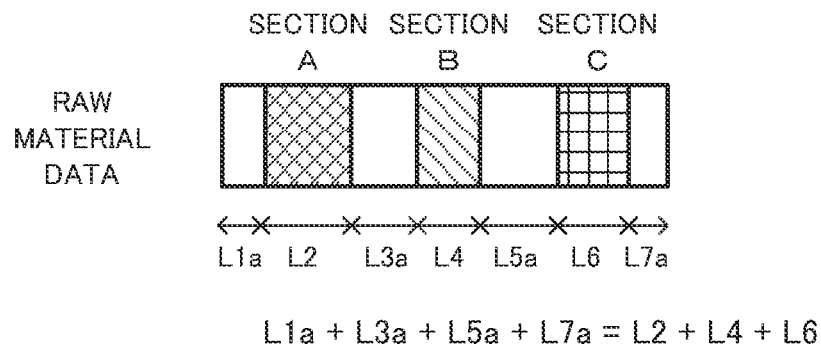
FIG. 9B illustrates the length of important section and the length of non-important section in the raw material data normalized so that the length of the important section and the length of the non-important section in the raw material data are equal.

FIG. 9B shows each length of the important sections and the non-important sections in the raw material data Dr normalized so that the length of the important sections in the raw material data Dr used for training is equal to the length of the non-important sections. As shown in FIG. 9B, by shortening the length of each non-important section (deleting the number of frames in the case of video), the learning unit 56 adjusts the total length (L2+L4+L6) of the important sections and the total length (L1a+L3a+L5a+L7a) of the non-important sections to be the same length. In this case, for example, the learning unit 56 shortens each non-important section at a predetermined rate thereby to adjust the total length of the important sections and the total length of the non-important sections to be the same length. The learning unit 56 may extract, on the basis of any other approach, the learning data in which the total length of the non-important sections is shortened so as to have the same total length as the total length of the important sections.

According to this modification, the learning unit 56 can suitably training by using the learning data in which the length of the important sections and the length of the non-important sections are equal thereby to prevent the training biased toward the non-important sections.

(Second Modification)

When generating the label data DL at Step S24 in FIG. 6, the labeling unit 54 of the learning data generation device 10 may add, to the label data DL, information (also referred to as "weighting information") relating to weighting on each important section according to the importance level at the training stage.

First, as a first example of the weighting information, an example of determining the weight of each important section based on the number of times the each important section is used in the edited data De will be described with reference to FIGS. 10A and 10B.

Figure 10A:
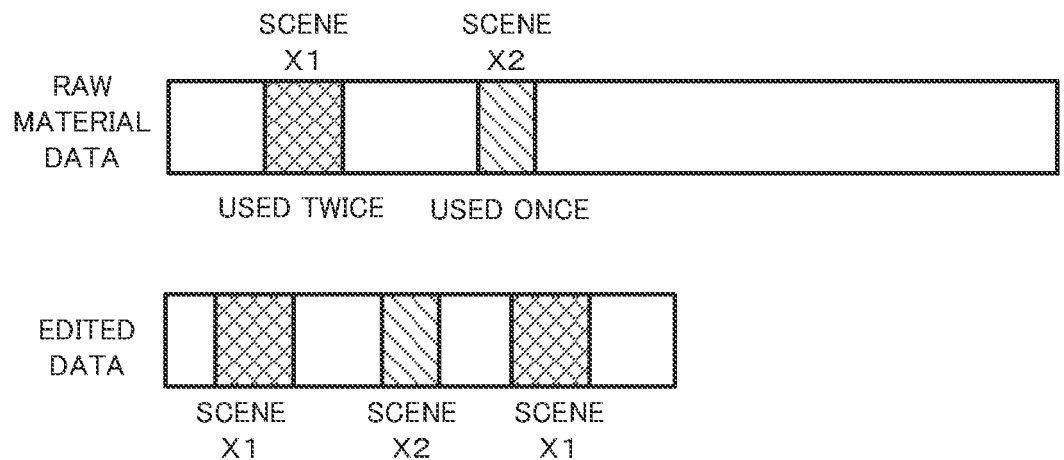
FIG. 10A illustrates an example of the correspondence of the matched section between the raw material data and the edited data.

FIG. 10A shows an example of the correspondence relationship of the matched section between the raw material data Dr and the edited data De. In this case, first, on the basis of the verification result Rm obtained by the verification process at step S23, the labeling unit 54 recognizes the scene X1 and the scene X2 in the raw material data Dr as matched sections between the raw material data Dr and the edited data De. Then, in this case, the labeling unit 54 generates the label data DL which indicates that each video section corresponding to the scene X1 and the scene X2 in the raw material data Dr is an important section and adds the weighting information on the each video section to the label data DL. Here, since the scene X1 is used twice in the edited data De and the scene X2 is used once in the edited data De, the labeling unit 54 sets the weight for the video section corresponding to the scene X1 larger than the weight for the video section corresponding to the scene X2. For example, the labeling unit 54 determines the weight on a scene to be the number of times the scene is used in the edited data De and therefore sets the weight for the video section corresponding to the scene X1 to "2" and sets the weight for the video section corresponding to the scene X2 to "1". It is noted that the labeling unit 54 may generate the weighting information indicating arbitrary weights such that the weight for the video section corresponding to the scene X1 is larger than the weight for the video section corresponding to the scene X2.

Figure 10B:
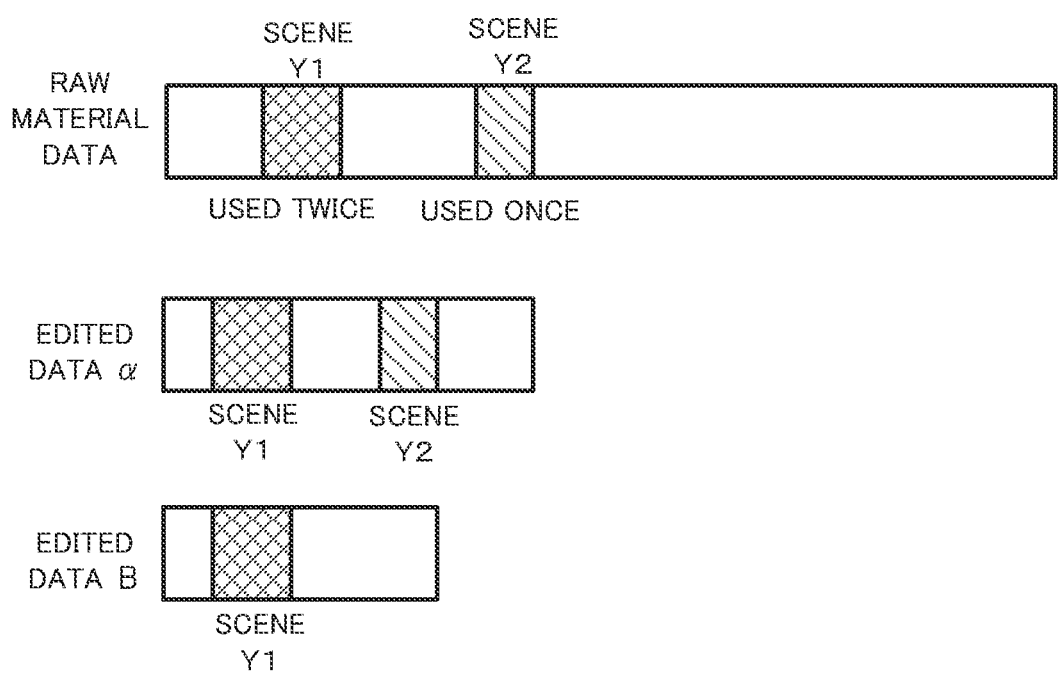
FIG. 10B illustrates an example of the correspondence of the matched section when the one raw material data corresponds to plural pieces of the edited data.

FIG. 10B shows an example of a correspondence relationship of the matched section when the raw material data Dr corresponds to plural pieces of the edited data De (edited data α and edited data β). In this case, the labeling unit 54 generates the label data DL indicating that each of the scene Y1 and the scene Y2 is an important section, and adds the weighting information relating to the scene Y1 and the scene Y2 to the label data DL. Here, since the scene Y1 is used once in the edited data α and once in the edited data β (twice in total), the labeling unit 54 sets the weight for the scene Y1 larger than the weight for the scene Y2 used only once in the edited data α.

In this way, the labeling unit 54 determines that the larger the number of times a scene is used in the edited data De, the larger the degree of the importance of the scene becomes, and generates the weighting information such that the weight for the important scene with the higher degree of the importance is higher. Thereby, the labeling unit 54 can suitably add weighting information, which allows learning considering the degree of the importance in each important section, to the label data DL.

Further, as a second example of the weighting information, on the basis of the attribute information of the edited data De, the labeling unit 54 may determine the weight for important sections in the raw material data Dr corresponding to the edited data De. Examples of the above-mentioned attribute information include information on the viewer rating, information on the time length of the edited data De and information indicating the importance of the edited data in time series. An example of generating weighting information based on the above-mentioned attribute information will be described below in order.

For example, when the information on the viewer rating is included in the metadata of the edited data De as the attribute information of the edited data De, the labeling unit 54 determines the weight for each important section based on the information on the viewer rating. For example, the labeling unit 54 generates such weighting information that the weight for each important section in the raw material data Dr is set to a value in accordance with viewer rating of the corresponding edited data De. In this case, the labeling unit 54 generates the weighting information such that the higher the viewer rating of the edited data De is, the larger the weight for the important scene used for the edited data De becomes. Instead of the viewer rating, the labeling unit 54 may determine the weight based on any index that objectively represents the number of viewers. This makes it possible to set a higher weighting for an important section used for edited data De in which viewers' interest is high.

Further, when using the time length of the edited data De as the attribute information of the edited data De, the labeling unit 54 generates such weighting information that the weight for each important section in the raw material data Dr is set to a value in accordance with the time length of the corresponding edited data De. In this case, the labeling unit 54 generates the weighting information such that the shorter the time length of the edited data De is, the larger the weight for the important scenes used for the edited data De becomes. In this case, the labeling unit 54 determines that the importance of the video section used in the edited data De increases with the decrease in the time length of the edited data De, and sets the weight for each important section in accordance with the time length. Even in this mode, the labeling unit 54 can suitably generate the weighting information indicating the weight of each important section set according to the importance of the each important section.

Further, when using the metadata indicating the degree of the importance in the time series of the edited data De as the attribute information of the edited data De, the labeling unit 54 sets the weight for each important section in the raw material data Dr, based on the degree of the importance of the corresponding video section in the edited data De. Thereby, the labeling unit 54 can generate weighting information to be added to the label data DL in consideration of the degree of importance in time series of the edited data De.

Next, learning by use of weighting information will be described. when performing the learning of the identifier based on the set of the label data DL and the raw material data Dr acquired by the acquisition unit 55, the learning unit 56 of the learning device 30 determines a weight for each important section in the raw material data Dr by referring to the weighting information added to the label data DL. Then, for example, the learning unit 56 adjusts parameters of the loss function so that the loss for misidentification of an important section increases with increase in the weight for the important section thereby to learn such an identifier that the loss is minimized. In another example, the learning unit 56 may determine the number of times of training of an important section according to the weight for the important section. For example, in the example (see FIGS. 10A and 10B) in which the number of times of use in the edited data De is the weight for each important section, the learning unit 56 performs the training only once for an important section in which the weight is 1 (i.e., the number of times of use is 1), and performs the training N times for an important section in which the weight is N (N is an integer of 2 or more). In this way, the learning device 30 can suitably perform learning considering the importance in each important section in the raw material data Dr.

(Third Modification)

According to the above explanation, the learning data generation device 10 executes the label data generation process (see FIG. 6) including the generation process of the editing feature quantity Fe and the generation process of the label data DL after the execution of the raw material feature quantity generation process (see FIG. 5) of generating the raw material feature quantity Fr. However, the execution procedure is not limited thereto.

For example, the learning data generation device 10 may perform the generation process of the raw material feature quantity Fr and the generation process of the label data DL after executing the generation process of the editing feature quantity Fe. In another example, the learning data generation device 10 may previously execute the generation process of the editing feature quantity Fe and the raw material feature quantity Fr thereby to store the editing feature quantity Fe and the raw material feature quantity Fr in the feature quantity storage unit 23 in advance and thereafter execute the generation process of the label data DL by referring to the feature quantity storage unit 23. In this case, a device other than the learning data generation device 10 may execute the generation processing of the editing feature quantity Fe and the raw material feature quantity Fr and store the generated editing feature quantity Fe and the raw material feature quantity Fr in the feature quantity storage unit 23.

(Fourth Modification)

If there are plural pieces of raw material data Dr captured in the same time period by plural cameras and the labeling unit 54 of the learning data generation device 10 determines an important section in one piece of the raw material data Dr, the labeling unit 54 may regard, as important sections, video sections in the other piece(s) of the raw material data Dr captured in the same time period as the determined important section in the one piece of the raw material data Dr.

Figure 11:
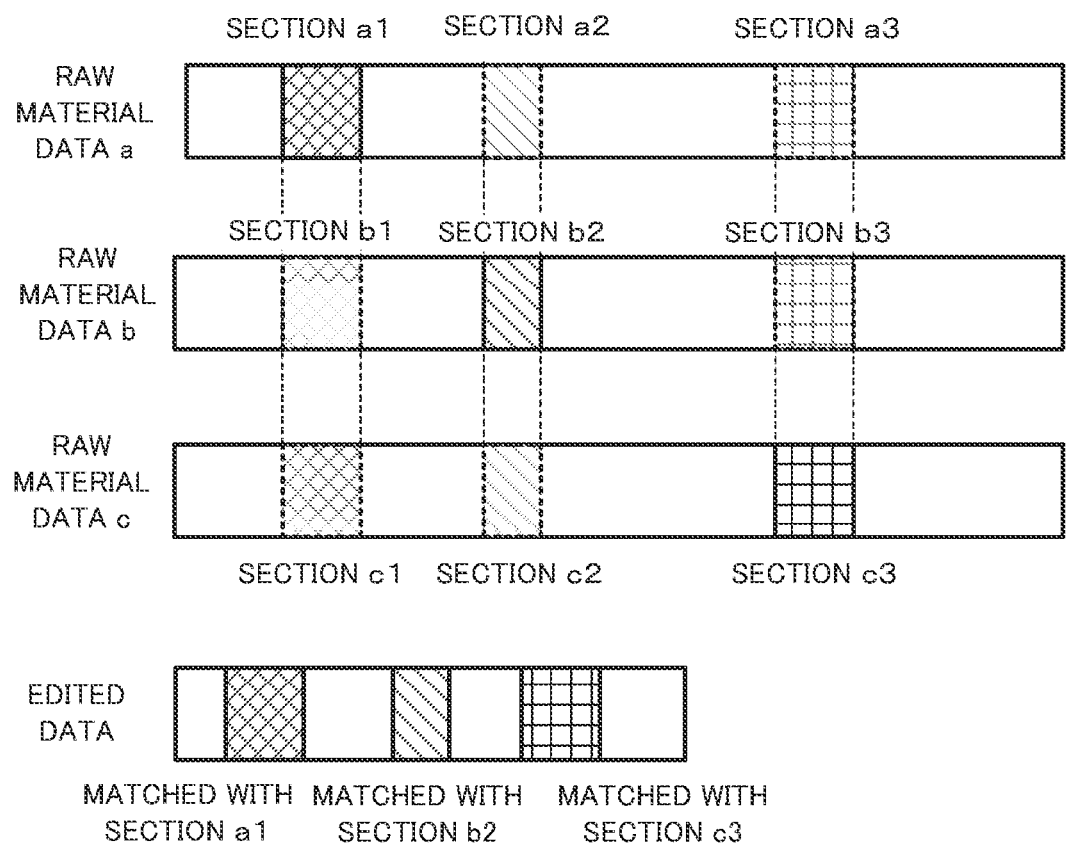
FIG. 11 illustrates the matched section between plural pieces of the raw material data taken by three cameras in the same time period and the edited data generated therefrom.

FIG. 11 illustrates matched sections between the raw material data Dr (raw material data a, raw material data b, raw material data c) taken in the same time period by three cameras and edited data De generated from these pieces of the raw material data Dr. The edited data De includes matched sections with a section a1 in the raw material data a, a section b2 in the raw material data b, and a section c3 in the raw material data c. In addition, each raw material data Dr contains metadata indicating the shooting date and time in time series.

In this case, the labeling unit 54 determines that the section a1 in the raw material data a, the section b2 in the raw material data b, and the section c3 in the raw material data c are important sections and that video sections in the other raw material data Dr taken in the same time period as the above important sections are also important sections. Then, the labeling unit 54 generates the respective label data DL for the raw material data a to the raw material data c. Specifically, the labeling unit 54 determines that the section b1 in the raw material data b and the section c1 in the raw material data c taken in the same time period as the section a1 in the raw material data a are important sections. Further, the labeling unit 54 determines that the section a2 in the raw material data a and the section c2 in the raw material data c captured in the same time period as the section b2 in the raw material data b are important sections. Furthermore, the labeling unit 54 determines that the section a3 in the raw material data a and the section b3 in the raw material data b taken in the same time period as the section c3 in the raw material data c are important sections.

According to this modification, the labeling unit 54 can efficiently and accurately execute the labeling of important sections.

(Fifth Modification)

When receiving the input data D1 indicating plural pieces of video data captured by plural cameras in the same time period, the identification device 40 may identify video sections, which are captured in the same time period as the important section identified for one video data, in the other video data as important sections.

In this case, the identification unit 58 of the identification device 40 identifies important sections by applying the identifier to at least one video data indicated by the input data D1. Then, after identifying an important section for one video data, the identification unit 58 also identifies, as important sections, video sections in the other video data in the same time period. In this way, the identification device 40 can identify the important section efficiently and accurately from a plurality of video data input.

(Sixth Modification)

In addition to generating the label data DL, the learning data generation device 10 may generate second label data that indicates a section (also referred to as "precursor section") which exists immediately before an important section and which represents a precursor of the important section.

Figure 12:
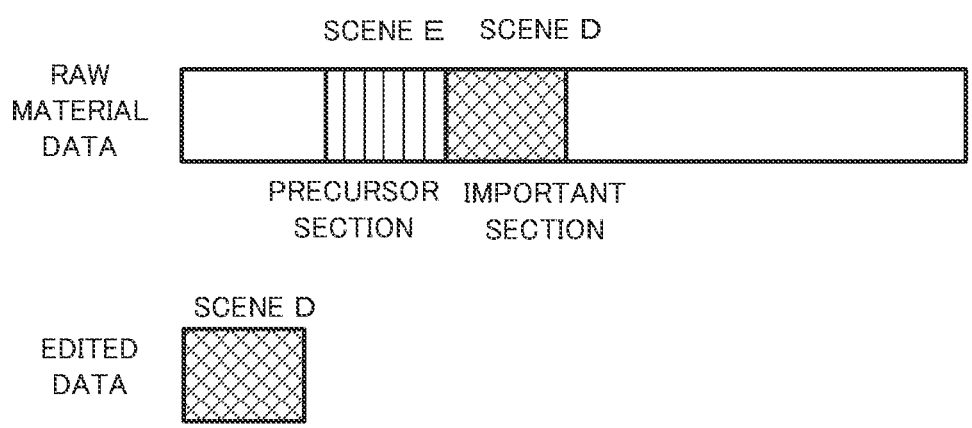
FIG. 12 illustrates a precursor section and an important section in the raw material data.

FIG. 12 illustrates a precursor section and an important section in the raw material data Dr. Further, in FIG. 12, the edited data De including only a scene D extracted from the raw material data Dr is shown. In this case, the raw material data Dr is, for example, video data captured by a surveillance camera and the edited data De is video data obtained by extracting an important portion such as a crime scene from the raw material data Dr.

In this case, the labeling unit 54 generates the label data DL which defines as an important section the video section corresponding to the scene D determined to be the matched section by the verification unit 53, and further generates second label data which defines a video section corresponding to the scene E immediately before the scene D as a precursor section. The labeling unit 54 stores the generated second label data together with the label data DL in the label data storage unit 24. In this case, for example, the labeling unit 54 defines a section with a time length immediately before the important section as a precursor section. The time length described above may be a predetermined time length or may be a time length determined based on the time length of the target important section.

The second label data relating to the precursor section generated in this way is suitably used for learning the identifier by the learning device 30. For example, the learning unit 56 of the learning device 30 refers to the second label data and performs the learning of the identifier so as to identify the precursor section in addition to the important section or instead of the important section, and stores the parameters obtained through the learning in the parameter storage unit 25. Thereby, the learning device 30 can suitably perform the learning of the identifier for identifying the precursor section.

Further, the identification unit 58 of the identification device 40 configures the identifier using the parameters stored in the parameter storage unit 25. Thus, by inputting the video data indicated by the input data D1 to the identifier described above, the identification unit 58 can suitably identify the precursor section. Then, when outputting the video data which is determined to be a precursor section by the identifier to the output device 60, the output unit 59 notifies that there is a sign to shift to the important scene. Thus, the output unit 59 can attract the user's attention so as to suitably suppress missing the important scene.

(Seventh Modification)

In addition to the generation of the label data DL, the learning data generation device 10 may perform detection of an object for each image included in the raw material data Dr and generate the second label data indicative of a video section in which the object is detected.

In this case, for example, through image recognition process, the labeling unit 54 detects an object from each image constituting the raw material data Dr corresponding to the label data DL to be generated. The object may be a predetermined object such as a particular person (player), a particular mark, a building, an instrument, an any other object. Then, the labeling unit 54 generates the second label data indicating a section where the object is detected. The labeling unit 54 stores the generated second label data together with the label data DL in the label data storage unit 24.

The second label data generated in this way is suitably used for learning the identifier by the learning device 30. For example, the learning unit 56 of the learning device 30 refers to the label data DL and the second label data and performs learning of the identifier so as to identify important sections in which the object is detected, and stores the parameters obtained by the learning in the parameter storage unit 25. In this case, by configuring the identifier using the parameters stored in the parameter storage unit 25, the identification device 40 can suitably identify the important section where the object is detected in the video data indicated by the input data D1.

Second Example Embodiment

Figure 13:
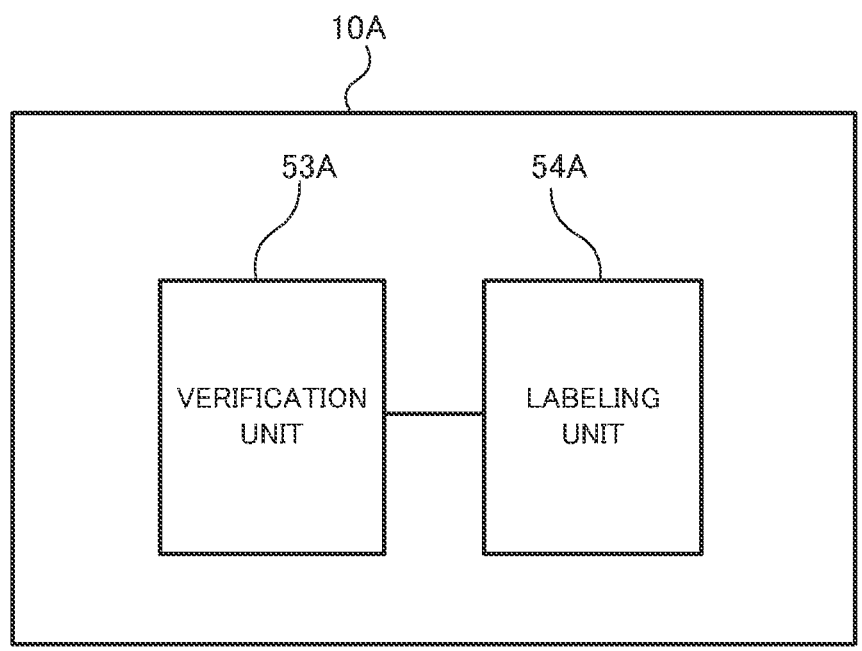
FIG. 13 illustrates a schematic configuration of a learning data generation device according to a second example embodiment.

FIG. 13 shows a schematic configuration of a learning data generation device 10A according to the second example embodiment. The learning data generation device 10A includes a verification unit 53A and a labeling unit 54A.

The verification unit 53A is configured to determine a matched section which is included in raw material data Dr and edited data De in common by performing verification of raw material feature quantity Fr that is feature quantity of the raw material data and editing feature quantity Fe that is feature quantity of the edited data De, the raw material data including at least one of video data or audio data. The labeling unit 54A is configured to generate, as label data DL corresponding to the raw material data Dr, information which defines the matched section as an important section and defines a section other than the matched section as a non-important section.

The learning data generation device 10A according to the second example embodiment can suitably generate the label data DL relating to the important section used for the edited data De without any user input by comparing the raw material feature quantity Fr with the editing feature quantity Fe.

The whole or a part of the example embodiments described above (including modifications, the same applies hereinafter) can be described as, but not limited to, the following Supplementary Notes.

[Supplementary Note 1]

A learning data generation device comprising:
 a verification unit configured to determine a matched section which is included in raw material data and edited data in common by performing verification of feature quantity of the raw material data and feature quantity of the edited data, the raw material data including at least one of video data or audio data; and
 a labeling unit configured to generate, as label data corresponding to the raw material data, information which defines the matched section as an important section and defines a section other than the matched section as a non-important section.

[Supplementary Note 2]

The learning data generation device according to Supplementary Note 1, further comprising:
 an acquisition unit configured to acquire the raw material data and the edited data; and
 a feature extraction unit configured to extract the feature quantity of the raw material data and the feature quantity of the edited data.

[Supplementary Note 3]

The learning data generation device according to Supplementary Note 1 or 2,
 wherein the labeling unit is configured to add weighting information to the label data, the weighting information indicating a weight for each important section with respect to training.

[Supplementary Note 4]

The learning data generation device according to Supplementary Note 3,
 wherein the labeling unit is configured to add the weighting information to the label data, the weighting information indicating the weight for each important section, the weight being determined based on the number of times the each important section is used in the edited data.

[Supplementary Note 5]

The learning data generation device according to Supplementary Note 3,
 wherein the labeling unit is configured to add the weighting information to the label data, the weighting information being generated based on attribute information of the edited data.

[Supplementary Note 6]

The learning data generation device according to Supplementary Note 5,
 wherein the attribute information is information on a viewer rating of the edited data, information on a time length of the edited data, or information indicating importance of the edited data in time series.

[Supplementary Note 7]

The learning data generation device according to any one of Supplementary Notes 1 to 6,
 wherein the edited data is data generated by editing plural pieces of the raw material data,
 wherein the verification unit is configured to determine the matched section between each piece of the raw material data and the edited data by performing the verification of the feature quantity of the edited data and the each piece of the raw material data, and
 wherein the labeling unit is configured to generate the label data for the each piece of the raw material data.

[Supplementary Note 8]

The learning data generation device according to Supplementary Note 7,
 wherein the plural pieces of the raw material data are video data captured by plural cameras in a common time period, and
 wherein the labeling unit is configured to determine, when the matched section is included in one of the plural pieces of the raw material data, that a section in another of the plural pieces of the raw material data captured in a same time period as the matched section is the important section.

[Supplementary Note 9]
The learning data generation device according to any one of Supplementary Notes 1 to 8,
wherein the labeling unit is configured to generate second label data which defines a section immediately before the important section as a section representing a precursor of the important section.

[Supplementary Note 10]
The learning data generation device according to any one of Supplementary Notes 1 to 8,
wherein the labeling unit is configured to detect an object on each image included in the raw material data to generate second label data indicative of a section where the object is detected.

[Supplementary Note 11]
A learning device comprising:
an acquisition unit configured to acquire a set of label data and raw material data corresponding to the label data, the label data being generated by a learning data generation device according to any one of Supplementary Notes 1 to 10; and
a learning unit configured to learn, on a basis of the set of the label data and the raw material data, a learning model which identifies an important section and a non-important section in data including at least one of video data or audio data.

[Supplementary Note 12]
The learning device according to Supplementary Note 11,
wherein the learning unit is configured to learn the learning model based on raw material data in which a total length of the non-important section is shorten based on a total length of the important section.

[Supplementary Note 13]
The learning device according to Supplementary Note 11 or 12,
wherein the label data includes weighting information indicative of weight for each important section with respect to training, and
wherein the learning unit is configured to learn the learning model based on the weighting information.

[Supplementary Note 14]
The learning device according to any one of Supplementary Notes 11 to 13,
wherein second label data indicative of a section representing a precursor of the important section is added to the label data, and
wherein the learning unit is configured to learn the learning model based on the second label data.

[Supplementary Note 15]
An identification device comprising:
an acquisition unit configured to acquire input data which includes at least one of video data or audio data; and
an identification unit configured to identify an important section included in the input data by inputting the input data to a learning model learned by a learning device according to any one of Supplementary Notes 11 to 14.

[Supplementary Note 16]
The identification device according to Supplementary Note 15,
wherein the identification unit is configured to identify that a section in another video data other than one vide data in the input data is an important section, the another video data being captured by a camera other than a camera which captures the one vide data, the section in the another video data being captured in a same time period as an import section in the one video data.

[Supplementary Note 17]
The identification device according to Supplementary Note 15 or 16,
wherein the identification unit is configured to identify a section representing a precursor of the important section included in the input data by inputting the input data to a learning model learned by a learning device according to Supplementary Note 14.

[Supplementary Note 18]
The identification device according to Supplementary Note 17, further comprising
an output unit configured to perform a notification when outputting the input data belonging to the section representing the precursor or the important section.

[Supplementary Note 19]
A generation method executed by a learning data generation device, the generation method comprising:
determining a matched section which is included in raw material data and edited data in common by performing verification of feature quantity of the raw material data and feature quantity of the edited data, the raw material data including at least one of video data or audio data; and
generating, as label data corresponding to the raw material data, information which defines the matched section as an important section and defines a section other than the matched section as a non-important section.

[Supplementary Note 20]
A storage medium storing a program executed by a computer, the program causing the computer to function as:
a verification unit configured to determine a matched section which is included in raw material data and edited data in common by performing verification of feature quantity of the raw material data and feature quantity of the edited data, the raw material data including at least one of video data or audio data; and
a labeling unit configured to generate, as label data corresponding to the raw material data, information which defines the matched section as an important section and defines a section other than the matched section as a non-important section.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS 10, 10A Learning data generation device
11, 31, 41 Processor
12, 32, 42 Memory
13、33、43 Interface
20 Storage device
30 Learning device
40 Identification device
100 Digest Generation System

What is claimed is:

1. A learning data generation device comprising a memory storing a program and a processor configured to execute the program to:
   determine a matched section included in raw material data and in edited data of the raw material data by performing verification of a feature quantity of the raw material data and a feature quantity of the edited data, the raw material data including at least one of video data or audio data; and
   generate, as label data corresponding to the raw material data, information which defines the matched section as an important section and defines a section other than the matched section as a non-important section, the label data indicating a correct answer in a case where the raw material data is used as learning data for a learning model.

2. The learning data generation device according to claim 1,
   wherein the processor is further configured to:
   acquire the raw material data and the edited data; and
   extract the feature quantity of the raw material data and the feature quantity of the edited data.

3. The learning data generation device according to claim 1,
   wherein the processor is configured to add weighting information to the label data, the weighting information indicating a weight for the important section with respect to training of the learning model using the learning data.

4. The learning data generation device according to claim 3,
   wherein the processor is configured to add the weighting information to the label data, the weighting information indicating the weight for the important section, the weight being determined based on a number of times the important section is used in the edited data.

5. The learning data generation device according to claim 3,
   wherein the processor is configured to add the weighting information to the label data, the weighting information being generated based on attribute information of the edited data.

6. The learning data generation device according to claim 5,
   wherein the attribute information is information on a viewer rating of the edited data, information on a time length of the edited data, or information indicating importance of the edited data in time series.

7. The learning data generation device according to claim 1,
   wherein the edited data is data generated by editing plural pieces of the raw material data,
   wherein the processor is configured to determine the matched section between each piece of the raw material data and the edited data by performing the verification of the feature quantity of the edited data and the feature quantity of each piece of the raw material data, and
   wherein the processor is configured to generate the label data for the each piece of the raw material data.

8. The learning data generation device according to claim 7,
   wherein the plural pieces of the raw material data are video data captured by plural cameras in a same time period, and
   wherein the processor is configured to determine, when the matched section is included in one of the plural pieces of the raw material data, that a section in another of the plural pieces of the raw material data captured in the same time period as the matched section is the important section.

9. The learning data generation device according to claim 1,
   wherein the processor is configured to generate second label data which defines a section immediately before the important section as a section representing a precursor of the important section.

10. The learning data generation device according to claim 1,
    wherein the processor is configured to detect an object on each image included in the raw material data to generate second label data indicative of a section where the object is detected.

11. A learning device comprising a memory storing a program and a processor configured to execute the program to:
    acquire a set of label data and raw material data corresponding to the label data, the label data defining an important section and a non-important section in the raw material data, the important section corresponding to a matched section included in raw material data and in edited data of the raw material data, the non-important section corresponding to a section other than the matched section; and
    learn, on a basis of the set of the label data and the raw material data, a learning model which identifies the important section and the non-important section in input data including at least one of video data or audio data, the label data further indicating a correct answer where the raw material is used as learning data for the learning model.

12. The learning device according to claim 11,
    wherein the processor is configured to learn the learning model based on the raw material data in which a total length of the non-important section is shortened based on a total length of the important section.

13. The learning device according to claim 11,
    wherein the label data includes weighting information indicative of a weight for the important section with respect to training of the learning model, and
    wherein the processor is configured to learn the learning model based on the weighting information.

14. The learning device according to any one of claim 11,
    wherein second label data indicative of a section representing a precursor of the important section is added to the label data, and
    wherein the processor is configured to learn the learning model based on the second label data.

15. An identification device comprising a memory storing a program and a processor configured to execute the program to:
    acquire input data which includes at least one of video data or audio data; and
    identify an important section included in the input data by inputting the input data to a learning model learned, on a basis of a set of label data and raw material data, to identify the important section in the input data, the label data defining an important section in the raw material data, the important section corresponding to a matched section included in the raw material data and in edited data of the raw material data, the label data further indicating a correct answer where the raw material is used as learning data for the learning model.

16. The identification device according to claim 15, wherein the processor is configured to identify that a section in another video data other than the video data included in the input data is an important section, the another video data being captured by a camera other than a camera which captured the video data included in the input data, the section in the another video data being captured in a same time period as the important section in the video data included in the input data.

17. The identification device according to claim 15, wherein the processor is configured to identify a section representing a precursor of the important section included in the input data by inputting the input data to the learning model.

18. The identification device according to claim 17, wherein the processor is further configured to perform a notification when outputting the input data belonging to the section representing the precursor or the important section.

* * * * *